United States Patent
Inoue (10) Patent No.: US 9,013,609 B2
(45) Date of Patent: Apr. 21, 2015

(54) IMAGE PROCESSING APPARATUS, IMAGE PICKUP APPARATUS AND IMAGE PROCESSING PROGRAM FOR CORRECTING COLOR BLUR

(75) Inventor: Chiaki Inoue, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 101 days.

(21) Appl. No.: 13/018,887

(22) Filed: Feb. 1, 2011

(65) Prior Publication Data

US 2011/0187887 A1  Aug. 4, 2011

(30) Foreign Application Priority Data

Feb. 2, 2010 (JP) ................................. 2010-021015

(51) Int. Cl.
| | |
|---|---|
| H04N 5/217 | (2011.01) |
| H04N 9/64 | (2006.01) |
| H04N 5/208 | (2006.01) |
| G06K 9/00 | (2006.01) |
| G06K 9/40 | (2006.01) |
| G06K 9/36 | (2006.01) |
| H04N 5/228 | (2006.01) |

(52) U.S. Cl.
CPC . *G06K 9/36* (2013.01); *H04N 5/228* (2013.01)

(58) Field of Classification Search
USPC .......... 348/208.12, 241, 222.1; 382/255, 162, 382/167, 275
See application file for complete search history.

(56) References Cited

U.S. PATENT DOCUMENTS

| | | | |
|---|---|---|---|
| 8,111,300 B2* | 2/2012 | Hwang et al. | 348/222.1 |
| 8,279,318 B2* | 10/2012 | Suzuki et al. | 348/333.01 |
| 2006/0017891 A1* | 1/2006 | Conner | 353/81 |
| 2006/0028577 A1* | 2/2006 | Honjo et al. | 348/345 |
| 2007/0098291 A1* | 5/2007 | Niikura et al. | 382/254 |
| 2008/0151096 A1* | 6/2008 | Okada | 348/345 |
| 2008/0218611 A1* | 9/2008 | Parulski et al. | 348/262 |
| 2008/0259176 A1* | 10/2008 | Tamaru | 348/222.1 |
| 2009/0039233 A1* | 2/2009 | Hiraga et al. | 250/201.8 |
| 2009/0066818 A1* | 3/2009 | Lim et al. | 348/252 |
| 2009/0224169 A1* | 9/2009 | Sawada | 250/396 R |
| 2010/0166305 A1* | 7/2010 | Song et al. | 382/167 |

FOREIGN PATENT DOCUMENTS

| | | |
|---|---|---|
| JP | 2006-115039 A | 4/2006 |
| JP | 2008-085773 A | 4/2008 |

* cited by examiner

*Primary Examiner* — Timothy J Henn
*Assistant Examiner* — Quan Pham
(74) *Attorney, Agent, or Firm* — Rossi, Kimms & McDowell LLP (57) ABSTRACT

The image processing apparatus includes a determining part configured to determine, from a difference between information on color of a first pixel in a first image and information on color of a second pixel corresponding to the first pixel in a second image, whether or not the first image includes color blur due to defocus, the first and second images being generated by an image-pickup system and whose focus states are mutually different. The apparatus further includes a correcting part configured to perform on the first image a correction process that corrects the color blur determined by the determining part.

8 Claims, 7 Drawing Sheets

IMAGE PROCESSING APPARATUS, IMAGE PICKUP APPARATUS AND IMAGE PROCESSING PROGRAM FOR CORRECTING COLOR BLUR

BACKGROUND OF THE INVENTION

1. Field of the Invention

The present invention relates to an image processing technique that corrects color blur of an image generated by image pickup.

2. Description of the Related Art

Images generated by image pickup performed by image pickup apparatuses such as digital cameras are often deteriorated by aberrations of an image taking optical system provided in the image pickup apparatus. In particular, longitudinal chromatic aberration of the image taking optical system causes color blur in a color image.

Since lights of mutually different wavelengths have mutually different refractive indices, these lights entering an image taking optical system form optical images at mutually different positions in an optical axis direction of the image taking optical system. Image-pickup elements each converting an object image (optical image) formed by the image taking optical system in the image pickup apparatus into electronic image information generally have a planar light-receiving surface, and only an optical image formed on the light-receiving surface is converted into sharp image information. Therefore, the longitudinal chromatic aberration generates, as the image information obtained by using the image-pickup element, an image including color blur generated by overlapping defocused color image components.

Japanese Patent Laid-Open No. 2008-85773 discloses a method for correcting color blur caused due to longitudinal chromatic aberration. This method obtains sharp (in-focus) images of respective wavelengths while changing a relative distance between an image taking optical system and an image-pickup element such that lights of the respective wavelengths form the sharp images on the image-pickup element, and combines these sharp images to obtain a color image in which the longitudinal chromatic aberration is corrected.

Moreover, so-called purple fringe also generates color blur, which deteriorates an image. The purple fringe is a phenomenon in which color blur of purple is generated near a high luminance area or the like in the image since point image distributions of respective wavelengths are mutually different due to longitudinal chromatic aberration, chromatic spherical aberration and chromatic comatic aberration. Japanese Patent Laid-Open No. 2006-115039 discloses a method for correcting such purple fringe. This method performs the correction by determining an area where the purple fringe is generated based on a distance from a luminance saturated area and closeness to chroma and hue of a specific color, and by performing a predetermined spatial operation on the determined area. This method uses a fact that the purple fringe is easily generated near the luminance saturated area and easily becomes a specific color of purple.

The method disclosed in Japanese Patent Laid-Open No. 2008-85773 combines the in-focus images of the respective wavelengths to correct the longitudinal chromatic aberration, which enables improvement of image quality. Moreover, the method disclosed in Japanese Patent Laid-Open No. 2006-115039 supposes the area where the purple fringe is generated and corrects the purple fringe to some degree on the basis of the supposition.

However, there are actually some cases where the methods disclosed in Japanese Patent Laid-Open Nos. 2008-85773 and 2006-115039 cannot correct the color blur well. For example, the methods cannot correct well color blur generated in an image obtained by image pickup for a three-dimensional object. Image pickup apparatuses generally focus on one plane (in-focus point) in an object space by an autofocus function or a manual focus operation and then perform image pickup. In such image pickup, in a case where an object including the plane is a three-dimensional object, object distances at respective angles of view are mutually different. In this case, a relatively sharp image of the in-focus point is obtained, but defocused images according to the object distances are obtained at out-of-focus points. Since the longitudinal chromatic aberration, the chromatic spherical aberration and the chromatic comatic aberration are varied according to the object distance, the color blur generated in the defocused image is varied according to a distance from the in-focus point. Such color blur being varied according to the object distance is hereinafter referred to as "color blur due to defocus". The method disclosed in Japanese Patent Laid-Open No. 2008-85773 can correct the color blur due to the longitudinal chromatic aberration for only an in-focus image of an object located at a specific distance, but cannot correct the color blur due to defocus. The method disclosed in Japanese Patent Laid-Open No. 2006-115039 cannot provide a sufficient effect to correct the color blur due to defocus since the method utilizes a tendency of generation of the color blur at the in-focus point.

SUMMARY OF THE INVENTION

The present invention provides an image processing apparatus, an image pickup apparatus and an image processing program which are capable of correcting the color blur due to defocus well.

The present invention provides as one aspect thereof an image processing apparatus including a determining part configured to determine, from a difference between information on color of a first pixel in a first image and information on color of a second pixel corresponding to the first pixel in a second image, whether or not the first image includes color blur due to defocus, the first and second images being generated by an image-pickup system and whose focus states are mutually different, and a correcting part configured to perform on the first image a correction process that corrects the color blur determined by the determining part.

The present invention provides as another aspect thereof an image pickup apparatus including an image-pickup system configured to perform image pickup to generate images, and an image processing apparatus. The image processing apparatus includes a determining part configured to determine, from a difference between information on color of a first pixel in a first image and information on color of a second pixel corresponding to the first pixel in a second image, whether or not the first image includes color blur due to defocus, the first and second images being generated by the image-pickup system and whose focus states are mutually different, and a correcting part configured to perform on the first image a correction process that corrects the color blur determined by the determining part.

The present invention provides as still another aspect thereof an image processing program causing a computer to perform image processing. The program including a step of obtaining a first image and a second image which are generated by an image-pickup system and whose focus states are mutually different, and a step of determining, from a difference between information on color of a first pixel in a first image and information on color of a second pixel corresponding to the first pixel in a second image, whether or not the first image includes color blur due to defocus, and a step of performing on the first image a correction process that corrects the color blur determined by the determining step.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

Embodiment 1

Figure 1:
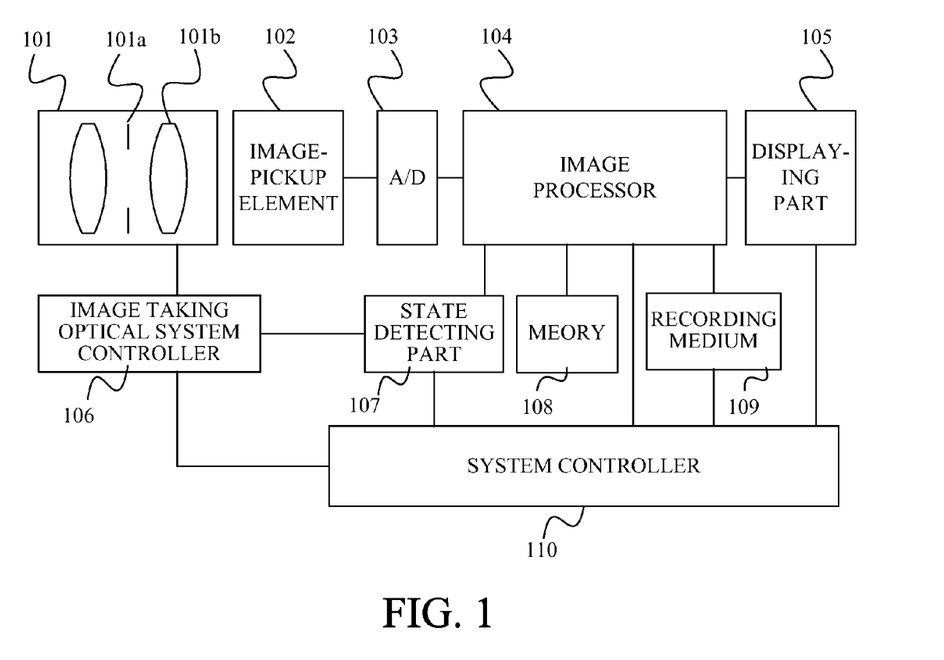
FIG. 1 is a block diagram showing a configuration of an image pickup apparatus that is Embodiment 1 of the present invention.

FIG. 1 shows a configuration of an image pickup apparatus that is Embodiment 1 of the present invention. An image taking optical system 101 includes an aperture stop 101a that changes its aperture diameter to adjust a light amount (F number) and a focus lens 101b that moves in an optical axis direction for focusing. A position of the focus lens 101b is controlled by an autofocus (AF) function and a manual focus operation. The image taking optical system 101 causes light from an object (not shown) to form an object image that is an optical image. The object image is converted into an electric signal by an image-pickup element 102 constituted by a photoelectric conversion element such as a CCD sensor and a CMSO sensor.

The electric signal (analogue signal) output from the image-pickup element 102 is converted into a digital signal by an A/D converter 103, and the digital signal is input to an image processor 104. The image processor 104 performs various signal processing on the input digital signal to generate image data. The image data is hereinafter referred to as a "captured image". The image taking optical system 101, the image-pickup element 102 and the image processor 104 constitute an image-pickup system.

The image processor (image processing apparatus) 104 performs a correction process of the color blur due to defocus on the captured image. The correction process of the color blur due to defocus will be described later, and is hereinafter simply referred to as "color blur correction". Specifically, the image processor 104 acquires information on a state of the image taking optical system 101, which is hereinafter referred to as an "image-pickup condition", from a state detecting part 107. Then, the image processor 104 selects color variation information corresponding to the image-pickup condition from a memory 108 to perform the color blur correction on the input captured image. The image processor 104 corresponds to a correcting part.

Next, description will be made of an image-pickup process including the color blur correction in the image pickup apparatus of this embodiment with reference to a flowchart shown in FIG. 2. A system controller 110 shown in FIG. 1 and constituted by a microcomputer performs the image-pickup process according to computer programs. The image taking optical system 101 is a zoom lens whose focal length is variable.

When an image-pickup start signal is input in response to a user's operation, the system controller 110 moves the focus lens 101b in the image taking optical system 101 to an in-focus position for a main object to be captured at a current zoom position (step S1). This focus control is performed through an image taking optical system controller 106 shown in FIG. 1. Thereby, an optical image of the main object is clearly formed on a light-receiving surface of the image-pickup element 102. The optical image of the main object is hereinafter referred to as a "main object image", and the in-focus position of the focus lens 101b for the main object is hereinafter referred to as a "first focus position".

Next, the system controller 110 acquires information on the image-pickup condition from the state detecting part 107 (step S2). The image-pickup condition includes a zoom position (focal length), an aperture value (F number) and a position of the focus lens 101b, which show the state of the image taking optical system 101.

Next, the system controller 110 calculates an object distance range where the color blur due to defocus may be generated by using the acquired information on the image-pickup condition. Then, the system controller 110 decides a second focus position that is a position of the focus lens 101b different from the first focus position in the calculated object distance range (step S3).

Next, the system controller 110 performs first image pickup in a state where the focus lens 101b is located at the first focus position, and causes the image processor 104 to generate a first captured image (first image) that is a captured image before the color blur correction (step S4). This first captured image is defined as a reference image in the color blur correction in this embodiment. The system controller 110 causes the image processor 104 to temporarily store the reference image therein.

When the first image pickup has been thus completed, the system controller 110 moves the focus lens 101b to the second focus position through the image taking optical system controller 106 (step S5).

Then, the system controller 110 performs second image pickup in a state where the focus lens 101b is located at the second focus position, and causes the image processor 104 to generate a second captured image (second image) that is also an image before the color blur correction but its focus state is different from that of the first captured mage (step S6). This second captured image is defined as a comparison image in the color blur correction in this embodiment. The system controller 110 causes the image processor 104 to temporarily store the comparison image therein.

Next, the system controller 110 performs the color blur correction according to an image processing program that is part of the above-described computer programs. The image processing program may be a computer program separate from the above-described computer programs.

The system controller 110 detects information on color for corresponding pixels (first pixels and second pixels corresponding to each other) in the reference and comparison images stored in the image processor 104 (step S7). The information on color in this embodiment includes chroma and hue. However, the information on color may include at least one of color difference, chroma and hue. The information on color is hereinafter simply referred to as "color information".

In order to detect the chroma and the hue, the system controller 110 converts the reference image and the comparison image which are respectively constituted by R, G and B components into data in a color space that has a luminance component and a color component separately. Although the color space of the converted data may be, for example, YCbCr, CIE L*a*b* or the like, this embodiment uses the CIE L*a*b* color space.

The chroma C and the hue θ that are elements of the color information in the CIE L*a*b* color space are decided by chromaticity a*, b*. The color information at a pixel of coordinates (x, y) in the reference image is denoted by chroma $C1(x, y)$ and hue $θ1(x, y)$. Moreover, the color information at a pixel of coordinates (x, y) in the comparison image is denoted by chroma $C2(x, y)$ and hue $θ2(x, y)$. The pixel (first pixel) of the coordinates (x, y) in the reference image and the pixel (second pixel) of the coordinates (x, y) in the comparison image are "corresponding pixels" whose coordinates are identical to each other.

Next, the system controller 110 as a determining part performs color blur determination (or color blur area determination) that is a first process in the color blur correction (step S8).

Specifically, the system controller 110 evaluates a variation amount of the color information at the corresponding pixels (that is, a difference between the color information at the first pixel and the color information at the second pixel) in the reference image and the comparison image whose focus states are mutually different because the positions of the focus lens 101b in the first image pickup and the second image pickup are mutually different, to determine whether or not the color blur due to defocus is generated. This makes it possible to determine an area where the color blur is generated. The area where the color blur is generated is hereinafter referred to as a "color blur area". The determination of whether or not the color blur is generated and the determination of the color blur area can be made by using the following expressions. Jc and Jθ respectively represent variation amounts of the color information, that is, the chroma and the hue, the chroma variation amount Jc and the hue variation amount Jθ being defined by the following expressions:

$$Jc = C1(x,y) - C2(x,y)$$

$$Jθ = θ1(x,y) - θ2(x,y).$$

When both the chroma variation amount Jc and the hue variation amount Jθ are 0, the variation (difference) of the color information due to the difference of the focus state is not generated, which means the color blur due to defocus is not generated. On the other hand, when at least one of the chroma variation amount Jc and the hue variation amount Jθ is other than 0, the color blur due to defocus is generated. Thus, the determination of generation of the color blur and the determination of the color blur area can be made.

Figure 3:
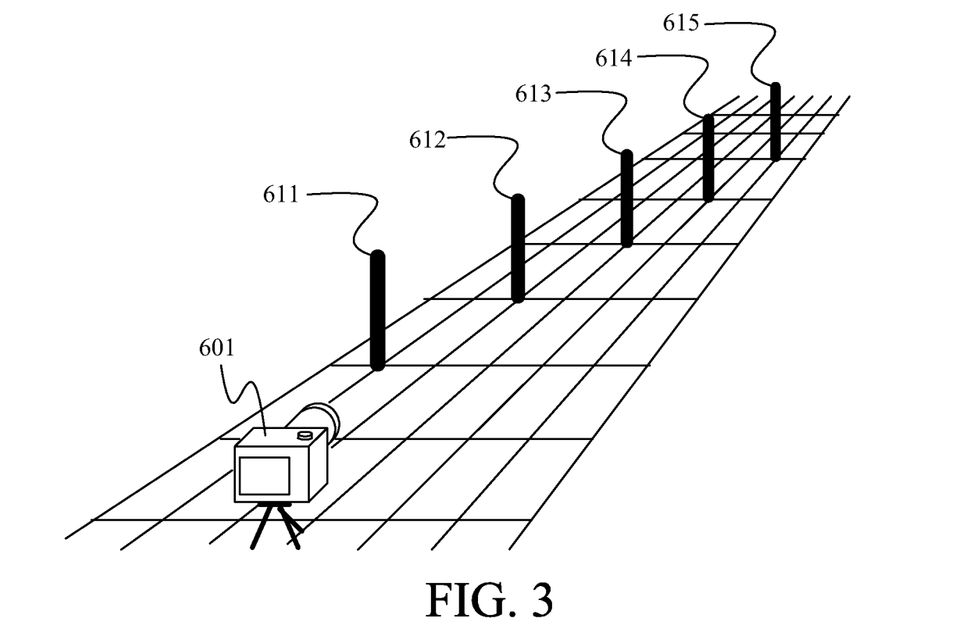
FIG. 3 shows a situation of image pickup in Embodiment 1.
Figure 4:
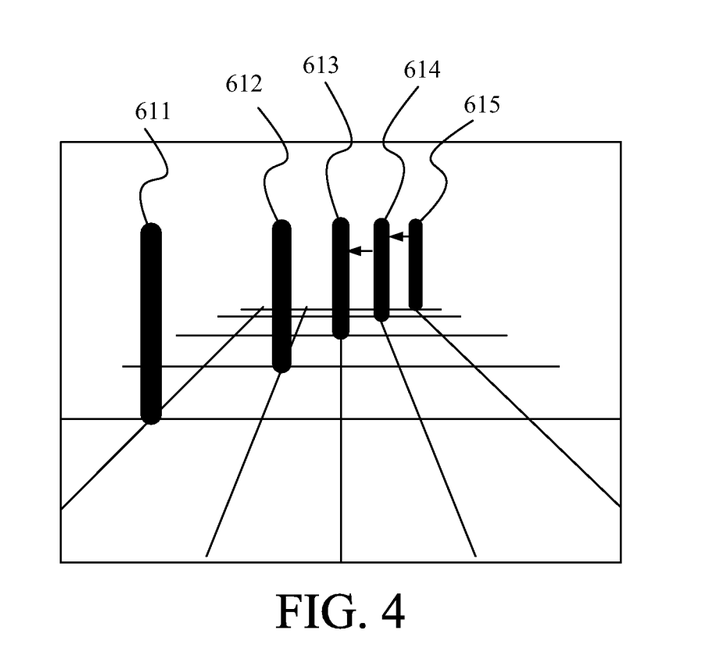
FIG. 4 shows a captured image in Embodiment 1.

Description will be made of examples of a case where the chroma and hue variation amounts are 0 and a case where the chroma and hue variation amounts are other than 0 with reference to FIGS. 3 to 8. FIG. 3 shows a state where an image pickup apparatus 601 performs image pickup of black sticks 611 to 615 that are objects placed obliquely from a far point toward a near point. The image pickup apparatus 601 is focused on the object 613. FIG. 4 shows a captured image captured in this state. Moreover, FIG. 5 is a cross-sectional view showing the color information in areas (shown by arrows) respectively including the objects 613 and 614 shown in FIG. 4.

Figure 5:
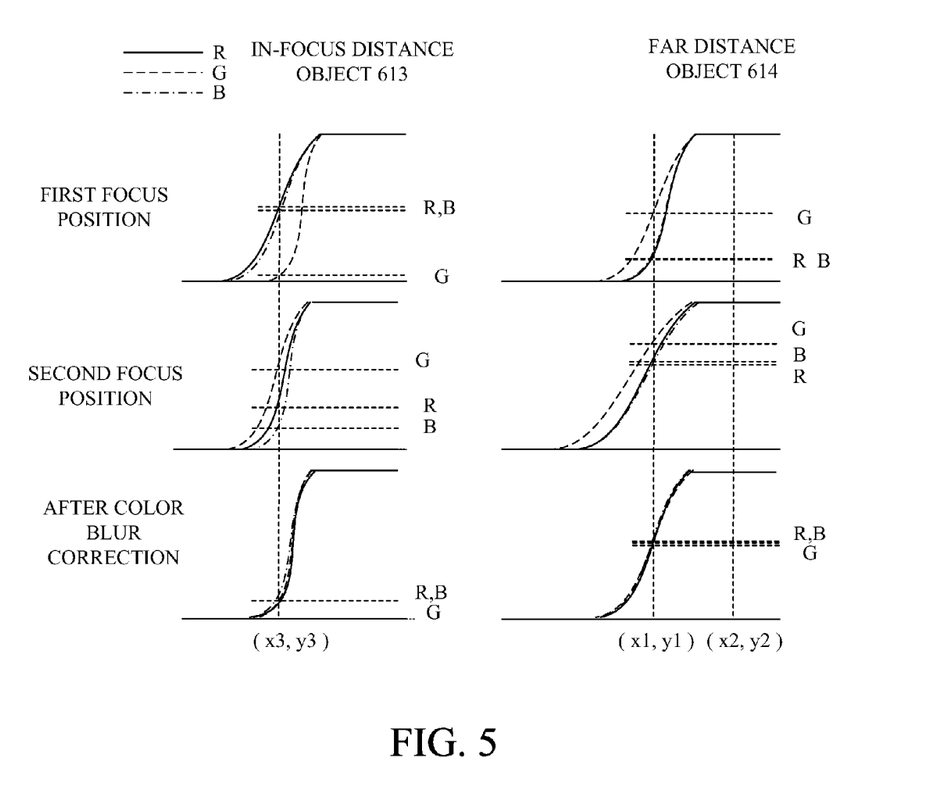
FIG. 5 shows color information in the captured image in Embodiment 1.

The object 613 in FIG. 5 is located at an object distance (in-focus distance) on which the image pickup apparatus 601 is focused (in-focus), and the object 614 is located farther than the in-focus distance. An upper part in FIG. 5 shows the color information in the areas including the objects 613 and 614 in the reference image. A middle part therein shows the color information in the areas including the objects 613 and 614 in the comparison image captured in a state where an in-focus distance is set to a distance between the object 613 and the object 612.

In the reference image, a G component is in focus for the object 613 located at the in-focus distance. Therefore, a defocus (out-of-focus) amount at an edge of the G component is smaller than those of an R component and a B component. The R component and the B component are further defocused by mutually nearly equal defocus amounts than the G component. An image formation state corresponding to the above state will be described with reference to FIG. 6.

Figure 6:
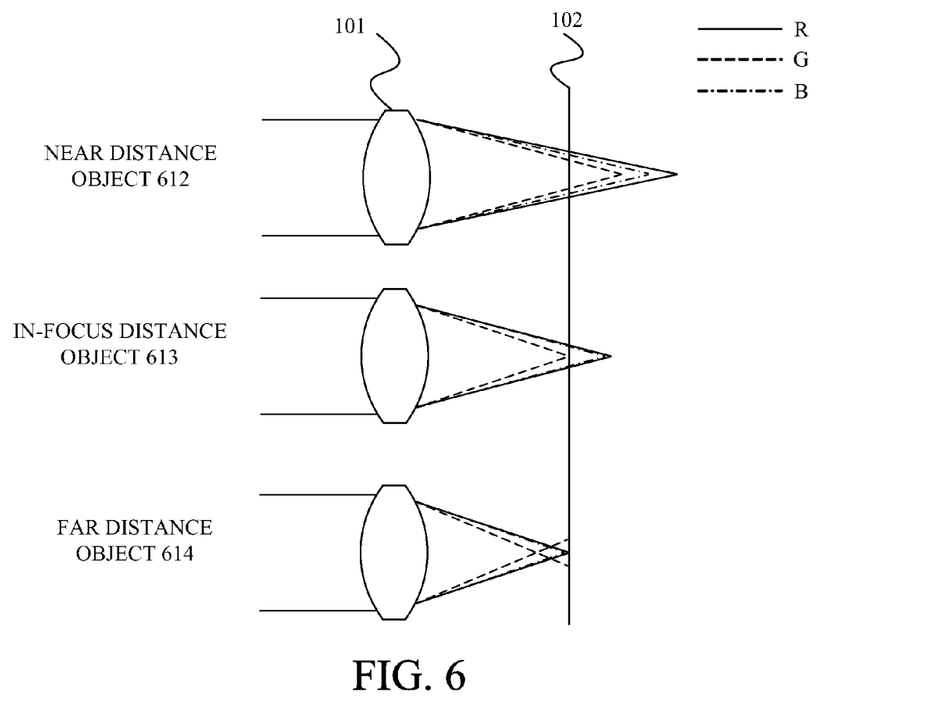
FIG. 6 shows chromatic aberration in Embodiment 1.

FIG. 6 shows R, G and B rays whose wavelengths are mutually different and which enter the image-pickup element 102 from objects located at the in-focus distance (shown at a middle part), at a near distance nearer than the in-focus distance (shown is an upper part) and at a far distance farther than the in-focus distances (shown at a lower part) through an image taking optical system. At the in-focus distance, the G ray forms a clear (sharp) object image of the G component on the image-pickup element 102, and however the R ray and the B ray have divergence on the image-pickup element 102, that is, object images of the R and G components are defocused.

On the other hand, at the far distance, the R and B rays form clear object images of the R and B components on the image-pickup element 102, but the G ray diverges on the image-pickup element 102 and therefore an object image of the G element is defocused. Furthermore, at the near distance, each of the R, G and B rays diverges, and in particular the R and B rays diverge further than the G ray.

FIG. 6 shows longitudinal chromatic aberration of the image taking optical system of the image pickup apparatus 601, and a similar phenomenon is generated in the variation of the color information at positions away from an optical axis of the image taking optical system in an image-pickup angle of view though an asymmetric property is generated in a basic image formation characteristic of the image taking optical system.

In the comparison image shown at the middle part in FIG. 5, an image-forming state of the object 613 is closer to an image-forming state when the object 613 is located at the far distance than that when the object 613 is located at the in-focus distance (as shown in the reference image), and the defocus amount of the object image of the G component is mainly increased. Moreover, in the comparison image, an image-forming state of the object 614 becomes an image-forming state when the object 614 is located at a farther distance, and the defocus amounts of the object images of the R and G components are mainly increased.

Figure 7:
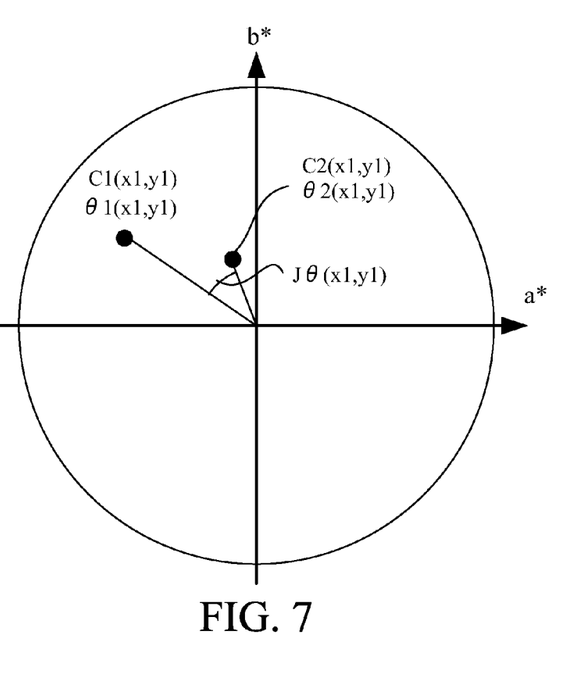
FIG. 7 shows a color space in Embodiment 1.

Description will be made of the color information at coordinates 1 (x1,y1) of a pixel in the vicinity of the object 614 in FIG. 5, the color information at coordinates 2 (x2,y2) of a pixel in the vicinity of a center of the object 614 and the color information at coordinates 3 (x3,y3) of a pixel in the vicinity of the object 613. FIG. 7 shows, as an example, the color information in a*b* space at the coordinates 1 (x1,y1) in the reference image and the color information in the comparison image. As clear from FIG. 5, at the coordinates 1 (x1,y1), a difference of the defocus amounts in the reference and comparison images is caused due to variations of the focus states of the R, G and B components. Therefore, as shown in FIG. 7, the chroma and the hue are both varied between in the reference image and in the comparison image. This variation corresponds to a defocus characteristic of the image taking optical system 101, and a similar variation thereto is inevitably caused between two captured images whose focus states for an object located at a specific distance are mutually different. Similarly, the chroma and the hue are also varied at the coordinates 3 (x3,y3). On the other hand, the chroma and the hue are not varied at the coordinates 2 (x2,y2) since a difference of the defocus amounts due to the variations of the focus states of the R, G and B components is not caused as clear from FIG. 5.

The chroma and hue variation amounts at each of the coordinates are obtained by calculating the difference of the color information at the corresponding pixels in the reference image and the comparison image by using the following expressions:

$$Jc(x1,y1)=C1(x1,y1)-C2(x1,y1)$$

$$J\theta(x1,y1)=\theta1(x1,y1)-\theta2(x1,y1)$$

$$Jc(x2,y2)=C1(x2,y2)-C2(x2,y2)$$

$$J\theta(x2,y2)=\theta1(x2,y2)-\theta2(x2,y2).$$

As clear from FIGS. 5 and 7, the chroma and hue variation amounts are as follows:

$$Jc(x1,y1)>0$$

$$J\theta(x1,y1)>0$$

$$Jc(x2,y2)=0$$

$$J\theta(x2,y2)=0.$$

Figure 8:
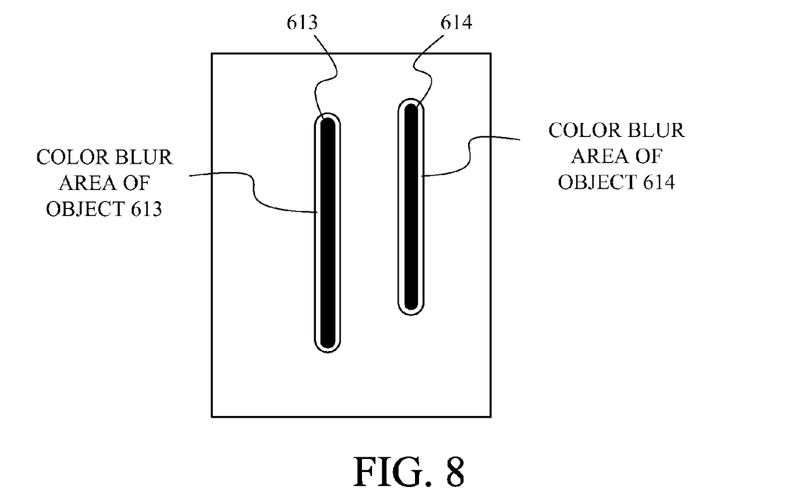
FIG. 8 shows determination of a color blur area in Embodiment 1.

In other words, the case where the chroma and hue variation amounts Jc and Jθ at certain coordinates are other than 0 shows that the color blur due to defocus is generated at the certain coordinates, and the case where both the chroma and hue variation amounts Jc and Jθ at certain coordinates are 0 shows that no color blur due to defocus is generated at the certain coordinates. Performing such determination on the entire reference image enables determination of the color blur area where the color blur due to defocus is generated in the reference image as shown in FIG. 8.

When the color blur area exists, the system controller 110 performs color blur amount estimation as a second process in the color blur correction (step S9). When no color blur area exists in the reference image, the system controller 110 determines that no color blur due to defocus is generated, and then ends the color blur correction.

Next, description will be made of the color blur amount estimation. As described above, the variation of the color information caused by the color blur due to defocus between the reference and comparison images whose focus states are mutually different corresponds to the defocus characteristic of the image taking optical system 101. In other words, the variation of the color information corresponds to a fact that, under a certain image-pickup condition, the longitudinal chromatic aberration, the chromatic comatic aberration and the chromatic spherical aberration are varied according to a shift amount (hereinafter referred to as a "defocus amount (defocus distance)") d of the object distance from an object distance position on which the image taking optical system is focused. The object distance position on which the image taking optical system is focused is hereinafter referred to as the "in-focus reference position".

Figure 9:
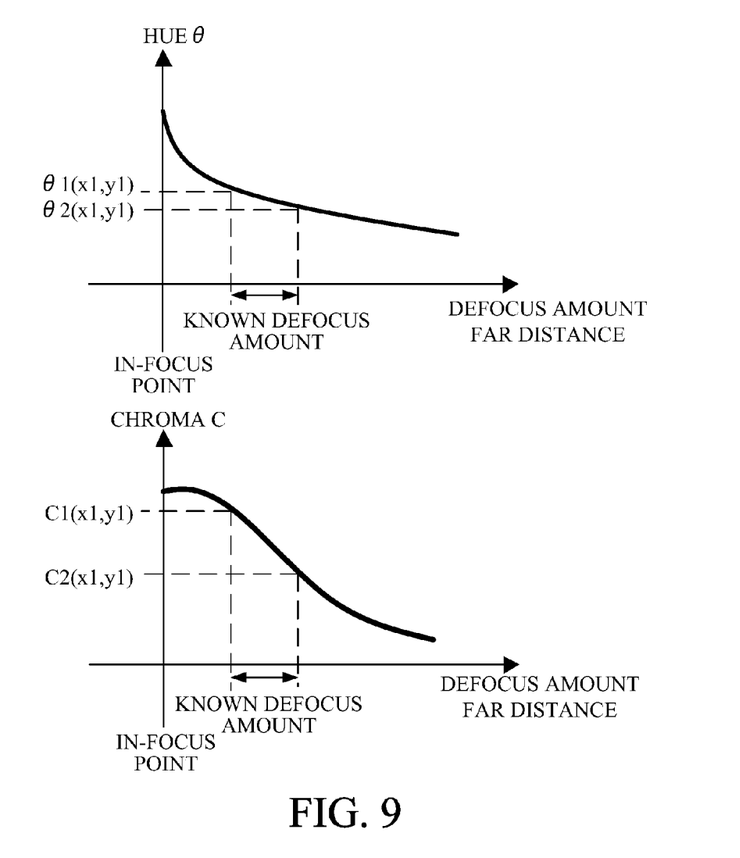
FIG. 9 shows determination of a color blur amount in Embodiment 1.

FIG. 9 shows a relationship between the defocus amount d and the hue θ, and a relationship between the defocus amount d and the chroma C when defining the first focus position for the image taking optical system 101 of this embodiment as the in-focus reference position. As understood from these relationships, the variation of the color information in the color blur area where the color blur due to defocus is generated can be expressed by a function whose variable is the defocus amount d.

This embodiment defines, as the functions of the chroma C and the hue θ whose variable is the defocus amount d, a chroma variation function fc(d) and a hue variation function fθ(d). Specifying these two functions makes it possible to correct the color blur in the reference image easily.

Specifying the chroma variation function fc(d) and the hue variation function fθ(d) requires in principal information on a distance to an object (object distance information), information on a color of the object (object color information) and information on variation of an optical performance of the image taking optical system 101 associated with variation of a focus state according to an image-pickup condition (optical performance variation information). Although the object distance information can be obtained by various measuring methods, most of them are not a measuring method easy to be implemented because of requirement of a special device other than the image taking optical system or the like.

Thus, this embodiment obtains information equivalent to the object distance information and the object color information, from the variation amount of the color information between the reference and comparison images whose focus states are made to be mutually different by a known defocus amount.

Specifically, the system controller 110 acquires the optical performance variation information that is information relating to the variation of the optical performance of the image taking optical system 101 associated with the variation of the focus state under the image-pickup condition at a time of acquisition (generation) of the reference image from the memory 108 in which the information is stored in advance. The optical performance variation information shows variations of chromatic aberrations such as longitudinal chromatic aberration, chromatic comatic aberration and chromatic spherical aberration. Variation rate of the chroma variation function fc(d) and the hue variation function fθ(d) with respect to the defocus amount d can be obtained from the optical performance variation information.

Then, the system controller 110 performs calculation for estimating the chroma variation function fc(d) and the hue variation function fθ(d) by using as parameters the optical performance variation information, the color information of each pixel in the reference and comparison images, C1, C2, θ1, θ2, the object distance information and the object color information. That is, the system controller 110 estimates the chroma variation function fc(d) and the hue variation function fθ(d) such that graphs thereof shown in FIG. 9 pass C1, C2, θ1 and θ2.

Although this embodiment describes the case where the chroma variation function fc(d) and the hue variation function fθ(d) are estimated by using two images that are the reference and comparison images, increase of the number of the comparison images can improve estimation accuracy.

Finally, the system controller 110 calculates an estimated object color and an estimated color blur amount from the chroma variation function fc(d) and the hue variation function fθ(d), which corresponds to a third process in the color blur correction. Then, the system controller 110 causes the image processor 104 to perform a color correction process for reducing the color blur due to defocus on the reference image by using the estimated object color and the estimated color blur amount (step S10).

A lower part of FIG. 5 shows images after the color blur correction. Although the color blur correction is made with reference to the G component in FIG. 5, it may be made with reference to the R component or the B component.

Moreover, the above-described processes may be performed on pixel by pixel basis or may be performed on each area including plural pixels according to a purpose of speed-up or the like.

After completion of the color blur correction performed on each pixel in the reference image, the system controller 110 displays an output image after the color blur correction on a displaying part 105 shown in FIG. 1 or records it to a recording medium 109 such as a semiconductor memory, and then ends the image-pickup process.

Although this embodiment described the case where the image pickup apparatus is integrally provided with the image taking optical system 101, the image pickup apparatus may be constituted by an interchangeable lens including an image taking optical system and an image pickup apparatus main body to which the interchangeable lens is detachably attached.

Embodiment 2

Next, description will be made of a second embodiment (Embodiment 2) of the present invention. This embodiment will describe an image pickup apparatus that generates a captured image by using as an image-pickup element 102 a Bayer-type image-pickup element in which R, G and B color filters are arranged in Bayer arrangement.

A signal obtained from each pixel of the Bayer-type image-pickup element has a signal value of one of R, G and B components. Image data produced by using such signals is referred to as "RAW image data". Each pixel of the RAW image data has only a signal value of one color component, so that this embodiment performs a color synthesis process (demosaicing process) to provide an RGB value to each pixel of an output image. The color synthesis process performs an interpolation process using signal values of plural pixels (peripheral pixels) around a target pixel to provide the RGB value to the target pixel.

However, since the RAW image data has only one signal value at each pixel, color information cannot be extracted therefrom. Therefore, this embodiment will describe color blur correction for a case where both the reference image and the comparison image are RAW image data. A configuration of the image pickup apparatus of this embodiment is basically the same as that of the image pickup apparatus of Embodiment 1 (shown in FIG. 1), and therefore components in this embodiment common to those of the image pickup apparatus of Embodiment 1 are denoted by the same reference numerals as those in Embodiment 1.

First of all, the system controller 110 extracts a feature amount relating to color of a target pixel (color information acquisition target pixel) by using the signal values of the peripheral pixels around the target pixel in order to acquire color information of each pixel. The extraction of the feature amount may be made by the above-described color synthesis process or a simplified color synthesis process. Moreover, the chroma and the hue which has been described in Embodiment 1 may be used as the color information. Furthermore, any one of color spaces being expressed by YCbCr, XYZ, Yuv and JCh may be selectively used.

Thus, the feature amount relating to color can be expressed by various expression methods, and the color information of the pixel can be expressed by an arbitrary expression method. The "color information" in this embodiment may be expressed by any expression methods as long as it represents the feature amount relating to color. This also applies to the case where one pixel originally has the R, G and B values as above-described Embodiment 1.

The system controller 110 once stores the color information of each pixel thus acquired. Then, the system controller 110 determines, as in Embodiment 1, the variation of the color information of the corresponding pixels in the reference and comparison images whose focus states are mutually different to determine the color blur area.

The determination of the color blur area may be made by using a comparison method corresponding to the color space such as YCbCr. Additionally, it may be made by using uv of Yuv or uv of Luv.

Next, the system controller 110 estimates the color blur amount in the color blur area by using a similar method to that used in Embodiment 1 to correct the color blur.

The color blur correction can be made by other methods such as a spatial operation with interpolation using pixels adjacent to the target pixel. An amount of the color blur correction may be decided according to a required image quality level of the output image, a permissible load value of the process or the like.

In addition, in order to more accurately perform the color blur correction described in Embodiments 1 and 2, matching of coordinates of the reference and comparison images may be made with reference to extracted edge portions of these images.

Embodiment 3

Although Embodiments 1 and 2 described the case where the image processor 104 as the image processing apparatus is provided in the image pickup apparatus, an alternative embodiment of the present invention is not limited thereto.

Figure 10:
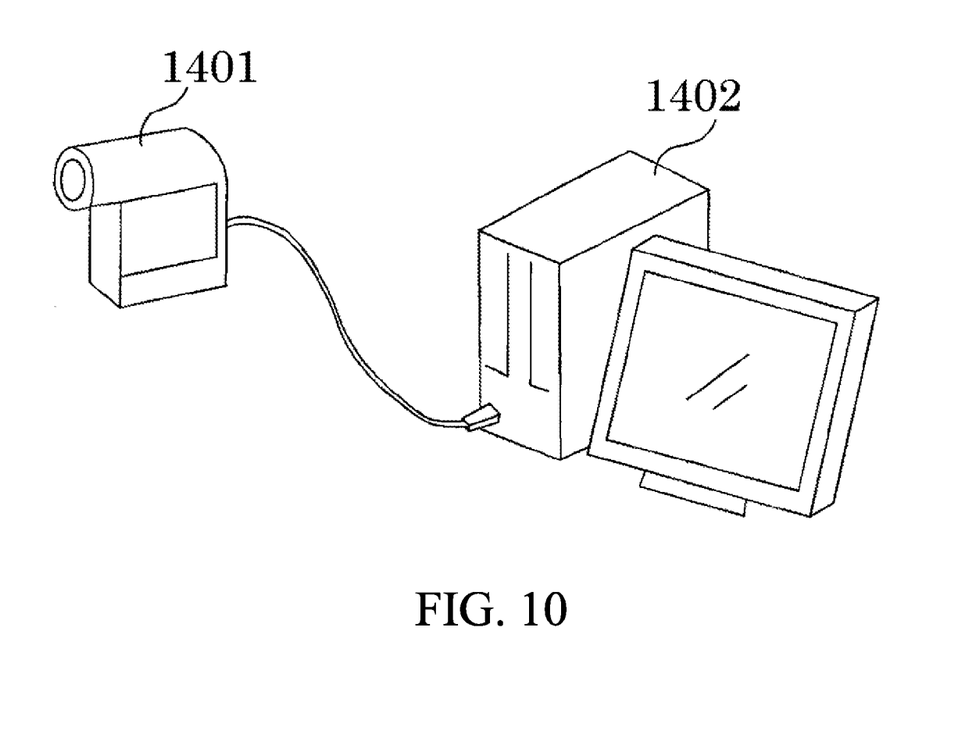
FIG. 10 shows a configuration of an image processing apparatus that is Embodiment 3 of the present invention.

For example, as shown in FIG. 10, image date generated by image pickup performed by an image pickup apparatus 1401 is transmitted to a personal computer 1402. A method for transmitting the image to personal computer 1402 may be any of a cable method and a wireless method through Internet or LAN.

Figure 2:
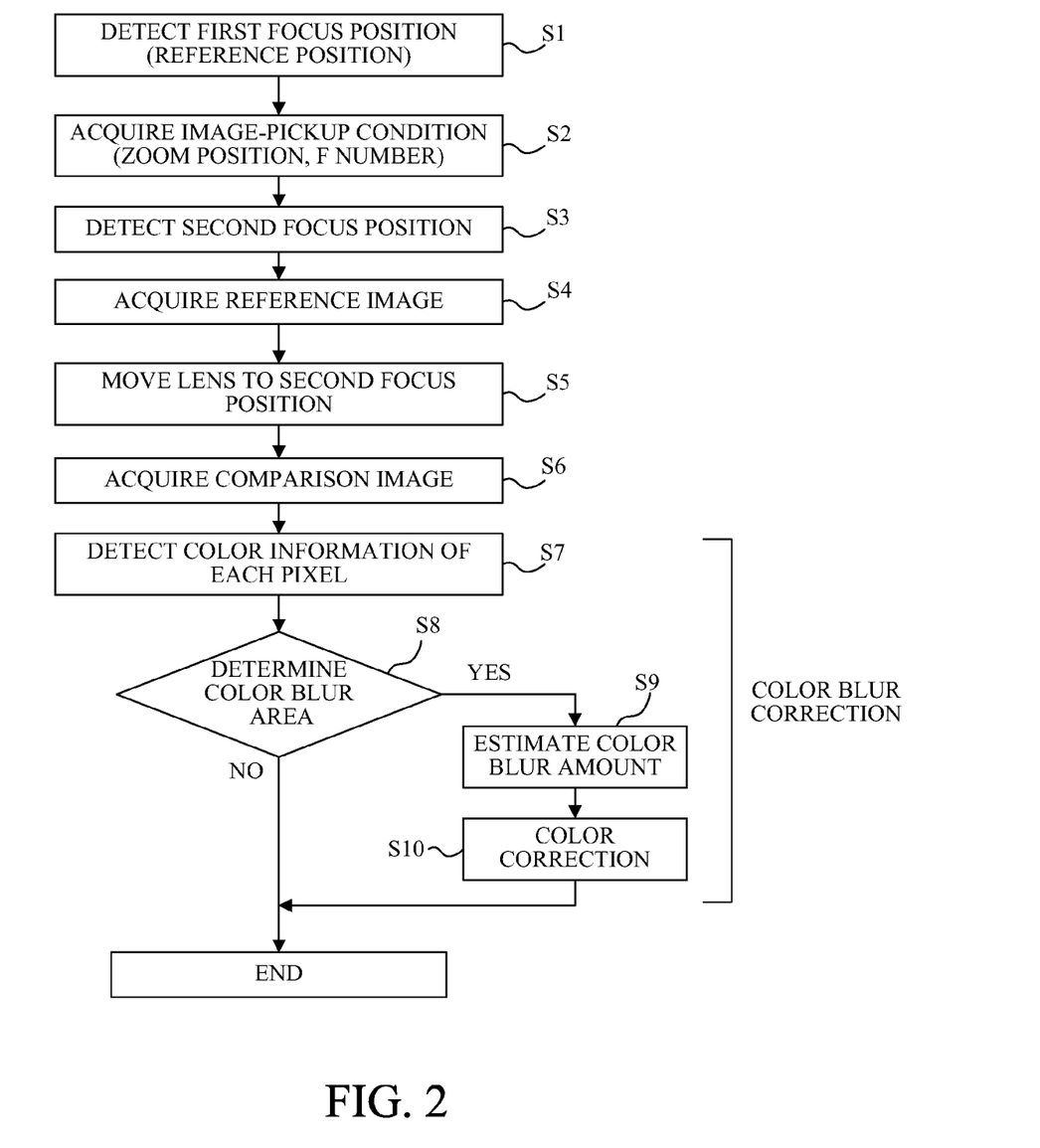
FIG. 2 is a flowchart showing an image-pickup process in Embodiment 1.

Then, the personal computer 1402 performs the color blur correction at steps S7 to S10 in the flowchart of FIG. 2. In this case, the personal computer 1402 serves as an image processing apparatus of an embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-021015, filed on Feb. 2, 2010, which is hereby incorporated by reference herein in its entirety.

What is claimed is:

1. An image processing apparatus comprising:
   a determining part configured to determine, from a difference between information on color of a first pixel in a first image and information on color of a second pixel corresponding to the first pixel in a second image, whether or not the first image includes color blur due to defocus, wherein the color blur due to defocus is color blur being generated by variation of longitudinal chromatic aberration, chromatic spherical aberration and chromatic comatic aberration of an image-pickup system depending on object distance, the first and second images being generated by image pickup of a three-dimensional object through the image-pickup system set in mutually different focus states; and a correcting part configured to perform on the first image a correction process that corrects the color blur determined by the determining part, wherein the correcting part is configured to calculate a variation function including as a parameter a defocus amount by using information on the variation of at least one of the longitudinal chromatic aberration, chromatic spherical aberration and chromatic comatic aberration corresponding to variation of the focus state of the image-pickup system and the information on color of each pixel in the first and second images;

estimate an amount of the color blur by using the variation function; and perform the correction process based on the estimated amount of the color blur.

2. An image processing apparatus according to claim 1, wherein the information on color includes information on chroma and hue.

3. An image processing apparatus according to claim 1, wherein each of the first image and the second image is of a substantive in-focus state.

4. An image processing apparatus according to claim 1, wherein the color blur due to defocus is generated by variation of a difference between blur of a green color component of the first image and blur of one of a red color component and a blue color component of the first image, depending on a defocus amount.

5. An image processing apparatus according to claim 1, wherein the color blur due to defocus is generated by overlapping of defocused color image components.

6. An image pickup apparatus comprising:
an image-pickup system configured to perform image pickup to generate images; and
an image processing apparatus,
wherein the image processing apparatus comprising:
a determining part configured to determine, from a difference between information on color of a first pixel in a first image and information on color of a second pixel corresponding to the first pixel in a second image, whether or not the first image includes color blur due to defocus, wherein the color blur due to defocus is color blur being generated by variation of longitudinal chromatic aberration, chromatic spherical aberration and chromatic comatic aberration of the image-pickup system depending on object distance, the first and second images being generated by image pickup of a three-dimensional object through the image-pickup system set in mutually different focus states; and a correcting part configured to perform on the first image a correction process that corrects the color blur determined by the determining part, wherein the correcting part is configured to calculate a variation function including as a parameter a defocus amount by using information on the variation of at least one of the longitudinal chromatic aberration, chromatic spherical aberration and chromatic comatic aberration corresponding to variation of the focus state of the image-pickup system and the information on color of each pixel in the first and second images;

estimate an amount of the color blur by using the variation function; and perform the correction process based on the estimated amount of the color blur.

7. An image processing method comprising:
obtaining a first image and a second image which are generated by image pickup of a three-dimensional object through an image-pickup system set in mutually different focus states;

determining, from a difference between information on color of a first pixel in the first image and information on color of a second pixel corresponding to the first pixel in the second image, whether or not the first image includes color blur due to defocus, wherein the color blur due to defocus is color blur being generated by variation of longitudinal chromatic aberration, chromatic spherical aberration and chromatic comatic aberration of the image-pickup system depending on object distance;

performing on the first image a correction process that corrects the determined color blur;

calculating a variation function including as a parameter a defocus amount by using information on the variation of at least one of the longitudinal chromatic aberration, chromatic spherical aberration and chromatic comatic aberration corresponding to variation of the focus state of the image-pickup system and the information on color of each pixel in the first and second images;

estimating an amount of the color blur by using the variation function; and performing the correction process on a basis of the estimated amount of the color blur.

8. A non-transitory computer-readable storage medium storing a program that, when executed by a computer, causes the computer to perform a method, the method comprising:
obtaining a first image and a second image which are generated by image pickup of a three-dimensional object through an image-pickup system set in mutually different focus states;

determining, from a difference between information on color of a first pixel in the first image and information on color of a second pixel corresponding to the first pixel in the second image, whether or not the first image includes color blur due to defocus, wherein the color blur due to defocus is color blur being generated by variation of longitudinal chromatic aberration, chromatic spherical aberration and chromatic comatic aberration of the image-pickup system depending on object distance;

performing on the first image a correction process that corrects the determined color blur;

calculating a variation function including as a parameter a defocus amount by using information on the variation of at least one of the longitudinal chromatic aberration, chromatic spherical aberration and chromatic comatic aberration corresponding to variation of the focus state of the image-pickup system and the information on color of each pixel in the first and second images;

estimating an amount of the color blur by using the variation function; and performing the correction process on a basis of the estimated amount of the color blur.

* * * * *